US008379812B1

(12) United States Patent
Nemer

(10) Patent No.: US 8,379,812 B1
(45) Date of Patent: Feb. 19, 2013

(54) SPENDING LIMIT GAUGE FOR TELEPHONE DEVICES

(75) Inventor: James R. Nemer, Spring Hill, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1508 days.

(21) Appl. No.: 11/710,014

(22) Filed: Feb. 22, 2007

(51) Int. Cl.
*H04M 15/00* (2006.01)

(52) U.S. Cl. .............. 379/114.03; 379/114.1; 379/114.2

(58) Field of Classification Search ............. 379/100.03, 379/100.04, 114.01, 114.03, 114.05, 121.02, 379/114.1, 114.2; 705/52, 77, 909
See application file for complete search history.

(56) References Cited

U.S. PATENT DOCUMENTS

| | | | | |
|---|---|---|---|---|
| 6,023,280 A | * | 2/2000 | Becker et al. ................. | 345/440 |
| 6,128,603 A | | 10/2000 | Dent et al. ...................... | 705/40 |
| 7,068,997 B2 | * | 6/2006 | Benco et al. ................... | 455/407 |
| 2004/0023636 A1 | * | 2/2004 | Gurel ............................ | 455/405 |
| 2005/0032505 A1 | * | 2/2005 | Himelhoch .................... | 455/405 |
| 2006/0041657 A1 | * | 2/2006 | Wen et al. ..................... | 709/224 |

* cited by examiner

Primary Examiner — Yuwen Pan
Assistant Examiner — Yosef K Laekemariam

(57) ABSTRACT

Methods are disclosed of assisting a user of a telephone device to manage their account with a telephone service provider. The method includes a step of displaying to the user a graphical display of current charges on their account together with an indicia indicating a spending limit associated with the account. The graphical display is designed such that the proximity of the sum of the current charges to the spending limit is displayed. The method further includes providing a display feature whereby the user can change the display to further display the current charges for the account, in addition to a charge for service by the telephone service provider which has not yet been incurred, such as for example the next monthly service charge. The graphical display of the spending limit gauge can take a variety of forms, such as bar graphics, or pie-chart. In one embodiment, the displays are presented on the display of a wireless telephone.

21 Claims, 5 Drawing Sheets

SPENDING LIMIT GAUGE FOR TELEPHONE DEVICES

BACKGROUND

A. Field

This invention relates to the field of telephony services and more particularly to methods for helping a telephone user manage their account with a telephony service provider.

B. Related Art

In the existing art, when a user signs up for telephone service with a telephone carrier, the user typically enters into a pre-pay/post-pay service contract. According to such a contract, the user agrees to pay the carrier a recurring amount of money in advance of each billing period in exchange for using a designated quantity of telephone service during the billing period. After the billing period, the carrier then bills the user an overage charge for any use of service that exceeded the designated quantity in the billing period. In addition, if the user incurs other charges during the billing period, such as for acquiring media (e.g., ringtones, screensavers, games, etc.) or hardware (e.g., telephones, accessories, etc.) from the carrier, the carrier may include those additional charges on the user's bill as well.

By way of example, a subscriber may sign up for a monthly service plan that gives the subscriber 1,000 base minutes of service per month for a cost of $40.00, with an overage charge of $0.10 per minute. Thus, in advance of each month, the subscriber would pay the carrier $40.00. If, during a given month, the subscriber then used 1,235 minutes of service and incurred $75.00 of purchase charges (e.g., for media or hardware), the carrier would thereafter bill the subscriber for an overage charge of $23.50 plus the purchase charge of $75.00.

Recognizing that certain subscribers are credit challenged, in that they sometimes have a hard time paying their bills on time, a carrier may further impose spending caps on certain subscribers. For instance, a carrier may limit certain subscribers to incur no more than a specified maximum in excess charges (including, for example, overage charges and purchase charges) beyond the subscriber's base service plan per billing period. Once the subscriber hits the specified maximum limit in excess charges, the carrier may then take an action such as cutting off the subscriber's service until the subscriber pre-pays an additional amount to the carrier.

By way of example, a carrier may impose a $100.00/month excess spending cap on certain subscribers. In a given month, if such a subscriber then incurs excess charges (such as overage charges and/or purchase charges) totaling or exceeding $100.00, the carrier may then block the subscriber from placing or receiving further calls until the subscriber pre-pays an additional amount to the carrier. To enforce this policy in practice, the carrier may automatically re-direct subsequent call attempts by the subscriber to a voice-response platform that will explain the situation to the subscriber and ask the subscriber to pay an additional amount in order to maintain service. Once the subscriber pays an additional amount, the carrier may then allow the subscriber to place the call or may automatically connect the subscriber's attempted call.

This disclosure answers a need in the art for providing a telephone user with information about their account which allows them to better manage their account and avoid loss of service due to exceeding their spending limit.

Prior art of interest directed to methods for managing and paying electronic billing statements includes Dent et al., U.S. Pat. No. 6,128,603.

SUMMARY

In a first aspect, a method is disclosed of assisting a user of a telephone device manage their account with a telephone service provider. The method includes a step of displaying to the user a graphical display of current charges on their account together with a indicia indicating a spending limit associated with the account. The graphical display is designed such that the proximity of the sum of the current charges to the spending limit is displayed. The method further includes providing a display feature whereby the user can change the display to further display the current charges for the account, in addition to a charge for service by the telephone service provider which has not yet been incurred, such as for example the next monthly service charge.

In one possible embodiment, the graphical display of current charges may take the form of a bar having one or more segments. The one or more segments display different types of charges, e.g., one segment is roaming charges and another segment is past due charges. The size or length of the segment indicates the magnitude of the charges. The indicia indicating a spending limit takes the form of a line which is spaced from the bar by an amount indicative of the amount of charges that can be incurred before exceeding the spending limit. Other forms for graphical display are also possible, such as for example a pie chart comprising pie sections corresponding to different spending categories and the size of which is commensurate with charges for such categories. One of the pie section represents the spending amount remaining before the spending limit is reached.

The display may optionally include additional features to help the user manage their account. For example, the display may simultaneously display an icon or link which when activated facilitates making a payment to the service provider. As another example, the display may include alphanumeric text indicating the amount of charges that can be incurred until the spending limit is reached, or a date on which the charge for service by the telephone service provider which has not yet been incurred will be posted to the account and the amount, if any, the account will be over the spending limit on that date.

The methods are suitable for implementation in software on a wireless telephone. Alternatively, the methods can be performed by a general purpose computer having a display and access to account information. In the case of a wireless telephone, the data for use in generating the graphical display can be downloaded on request to the wireless telephone from a billing system over an air interface, or generated and stored locally on the wireless telephone when the wireless telephone engages in activity which incurs charges to their account.

Another aspect of the invention is embodied as an improvement to a wireless telephone having a display. The telephone is associated with an account with a wireless service provider. The improvement takes the form of software instructions stored in the wireless telephone for presentation of information as to the account on the display of the telephone, the instructions: a) displaying on the display a graphical display of current charges for the account together with a indicia indicating a spending limit associated with the account, wherein the graphical display is designed such that the proximity of the sum of the charges to the spending limit is displayed on the display, and b) providing a display feature whereby the user can change the display to further display the current charges for the account in addition to a charge for service by the service provider which has not yet been incurred.

In still another aspect, the invention may take the form of a machine readable memory storing instructions for execution by a computer having a central processing unit and a display. The memory stores software instructions (e.g., a Web browser) for enabling access to a billing system of a telephone service provider over a computer network. The memory further stores instructions for facilitating a user of the computer to view information relating to an account with the telephone service provider, the instructions: a) displaying on the display a graphical display of current charges for the account together with a indicia indicating a spending limit associated with the account, wherein the graphical display is designed such that the proximity of the sum of the charges to the spending limit is displayed on the display, and b) providing a display feature whereby the user can change the display to further display the current charges for the account in addition to a charge for service by the service provider which has not yet been incurred, such as the next month's charges which have not yet been posted.

These as well as other aspects, advantages, and alternatives will become apparent to those of ordinary skill in the art by reading the following detailed description with reference where appropriate to the accompanying drawings.

DETAILED DESCRIPTION

I. System Overview and Logging of Account Activity

An exemplary embodiment of the invention will be described here in the context of a cellular wireless communication system, where a wireless service provider bills subscribers with a pre-pay/post-pay arrangement like that described above. However, it should be understood that the invention can equally apply in other scenarios, such as with respect to other telecommunication services, whether wireless or landline. Further, the principles of the invention can be applied as well to other sorts of services, such as other utilities for instance, and also to other pay arrangements. Additionally, the spending limits could be set by the subscriber and not by the service provider.

Those skilled in the art will also appreciate that the description provided below is intended to illustrate and explain the invention by way of example only, and that numerous variations may be possible now or developed in the future, while remaining within the scope of the claimed invention. As such, structural elements and functions can be added, omitted, modified, re-ordered, combined, distributed, or otherwise changed. Further, it should be understood that various functions described herein can be carried out by hardware, firmware, and/or software, such as by one or more microprocessors programmed with machine language instructions for instance.

Figure 1:
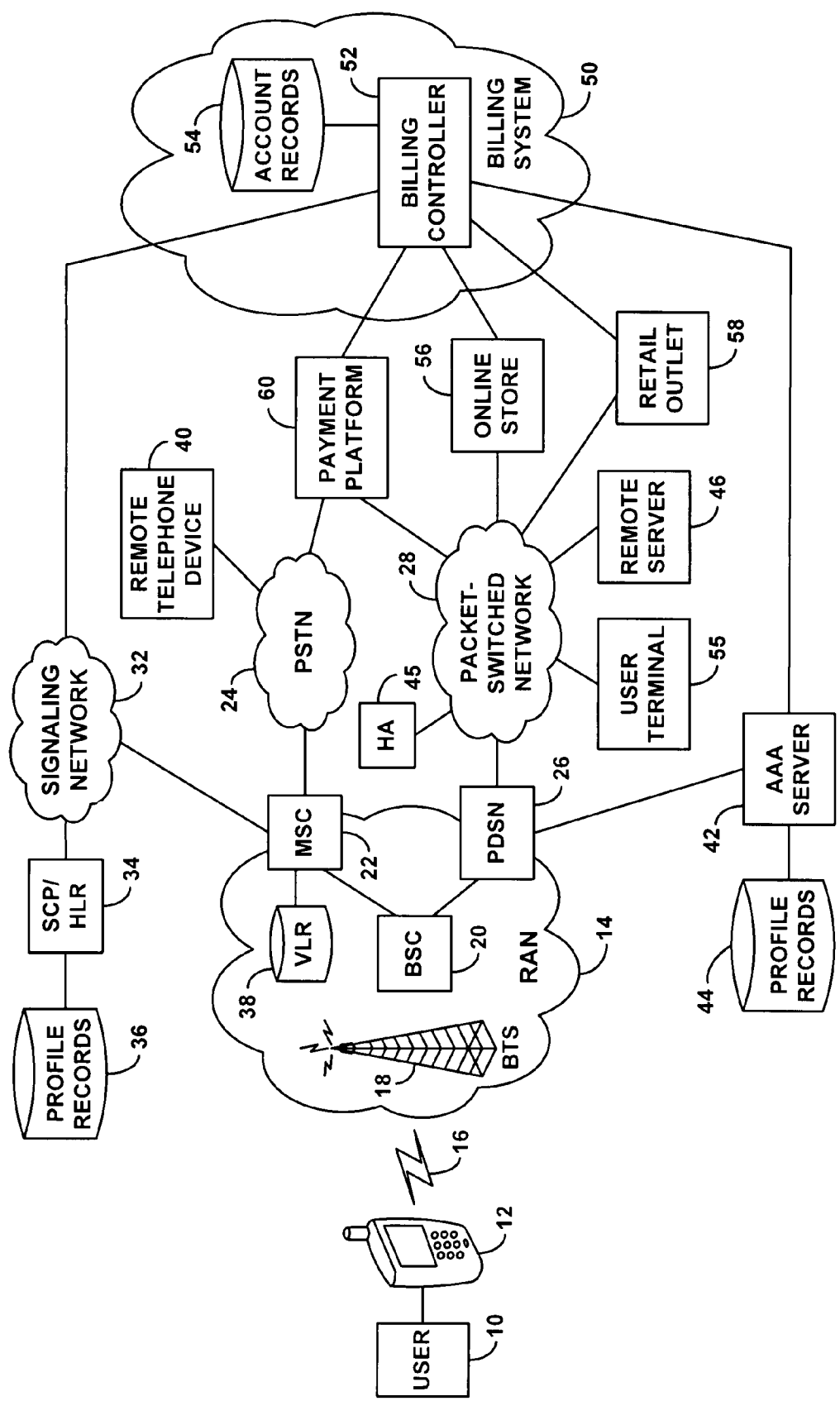
FIG. 1 is a block diagram of a telecommunications system in which an exemplary embodiment of the invention can be implemented.

Referring to the drawings, FIG. 1 is a block diagram of a telecommunication system in which an exemplary embodiment of the invention can be implemented. As shown in FIG. 1, the system includes a cellular wireless communication device 12 in communication with a radio access network (RAN) 14 over an air interface 16. Device 12, operated by a user 10, can be a cellular telephone, a wirelessly equipped personal digital assistant (PDA) or computer, or other device adapted to communicate over air interface 16 with RAN 14. Air interface 16 may operate according to any air interface protocol now known or later developed, such as CDMA, TDMA, or GSM, for instance.

RAN 14 includes a base transceiver station (BTS) 18 that radiates to define a wireless coverage area in which device 12 can communicate over air interface 16 with the BTS 18. BTS 18 is then coupled with a base station controller (BSC) 20 that generally controls operation of the BTS 18 (and perhaps one or more other BTSs). BSC 20 is, in turn, coupled with or integrated in one or more nodes that provide connectivity with one or more transport networks. For instance, in the arrangement as shown, BSC 20 is coupled with a mobile switching center (MSC) 22 that provides connectivity with the public switched telephone network (PSTN) 24, and BSC 20 is further coupled with a gateway such as a packet data serving node (PDSN) 26 that provides connectivity with a packet-switched network 28 such as a private packet network or the Internet.

As noted above, this cellular wireless arrangement depicted is only one example. In an alternative embodiment, device 12 could be a landline telephone or computer coupled by a landline (e.g. wired) connection with a switch or gateway (e.g., network access server) that provides connectivity with a transport network. Other arrangements are possible as well.

As shown in FIG. 1, MSC 22 is coupled with a signaling network 32, which provides connectivity with a service control point (SCP) and/or home location register (HLR) 34. SCP/HLR 34 includes or is coupled with a subscriber profile database 36, which contains service profile records for subscriber devices such as device 12. Further, when device 12 is registered with MSC 22, MSC 22 may maintain a copy of the service profile record for device 12 in a visitor location register (VLR) 38 for reference when setting up calls for device 12.

As a general matter, when user 10 seeks to call a remote telephone device 40 on PSTN 24, device 12 sends an origination request message over air interface 16 to RAN 14, providing the telephone number of the remote device 40. Upon receipt of the origination message, MSC 22 may send a signaling message (e.g., an IS-41 Origination Request message) to SCP/HLR 34 for assistance with call processing. SCP/HLR 34 may then reference the service profile record for device 12 to determine how to handle the call and may instruct MSC 22 accordingly. Under normal circumstances, MSC 22 may then set up the call to the remote device 38 over PSTN 24 and may then allow the call to proceed.

PDSN 26, on the other hand, is communicatively linked with an authentication, authorization, and accounting (AAA) server 42, which similarly includes or is coupled with a subscriber profile database 44 containing service profile records for subscriber devices such as device 12. (For simplicity, FIG. 1 shows a direct link between PDSN 26 and AAA server 42.

In typical practice, however, the PDSN and AAA server may communicate with each other through packet-switched network 28.)

When user 10 seeks to engage in data communication over packet-switched network 28 (such as a web browsing session, a voice-over-IP session, or another sort of data communication), device 12 sends a packet-data origination message, or connection message, over the air interface 16 to RAN 14. Upon receipt of the origination messages, PDSN 26 may engage in signaling with AAA server 42 to determine whether the device is authorized to engage in packet-data communications. PDSN 26 may then reference the service profile record for device 12 and may instruct PDSN 26 accordingly. Under normal circumstances, PDSN 26 may then engage in signaling with a mobile-IP home agent 45 on the packet-switched network to facilitate acquisition of an IP address for use by device 12. Upon acquisition of an IP address, device 12 may then engage in IP communications on packet-switched network, to communicate with other IP nodes, such as a remote server 46 for instance.

To track usage of telecom service and to facilitate billing users for the service, the system of FIG. 1 further includes a billing system 50. The billing system 50 can be as simple as a single computer or as complex as a network of computers and/or other equipment. As shown by way of example, the billing system 50 may include a billing controller 52 and an account database 54. Generally speaking, account database 54 contains subscriber account records, each of which may indicate an extent of a subscriber's usage and other charges to date in a current billing period and may further indicate other subscriber information, such as service profile information for instance. Billing controller 52 generally functions to receive and process usage and charge information and to maintain the account records in database 54.

In the exemplary embodiment, one function of billing system 50 is to track the extent to which a subscriber has engaged in telephone calling service via MSC 22. To facilitate this, billing system 50 is preferably coupled with signaling network 32, so that billing system 50 can receive usage reports from MSC 22. In typical practice, MSC 22 will be arranged to generate and send to billing system 50 a call detail record (CDR) for each call that MSC 22 handles. Each CDR may take the form of a database record and may include call information such as the calling number, the called number, the start time, the stop time, and the call duration.

Upon receipt of each CDR, billing controller 52 may then extract relevant information from the CDR and update an account record in database 54 accordingly, to increment a record of the subscriber's usage so far in the current billing period. For instance, if device 12 engages in a 10 minute call with remote telephone 40, MSC 22 may send billing system 50 a CDR that describes the call, and billing controller 52 may update the subscriber account record for device 12 to increment a running usage total by 10 minutes.

Note that the extent of calling service could be tracked in other increments as well, such as seconds for instance. Further, factors such as call distance or time of day can be considered in establishing an extent of a subscriber's usage. Still further, MSC 22, billing system 50, or another entity could be arranged to discount certain calling activity by subscribers, such as calls of particular types or calls placed to particular entities for instance.

Another function of billing system 50 in the exemplary embodiment is to track the extent to which a subscriber has engaged in data communication service via PDSN 26. To facilitate this, billing system 50 is preferably coupled with AAA server 42, so that billing system 50 can receive usage reports from AAA server 42. (For simplicity, FIG. 1 shows a direct link between AAA server 42 and billing system 50. In typical practice, however, the AAA server and billing system may communicate with each other through packet-switched network 28.)

In typical practice, PDSN 26 will be arranged to generate and send to AAA server 42 usage data records (UDRs) for each packet-data communication session that that it handles. More particularly, at the start of the session, the gateway may send a START UDR, at the end of the session, the gateway may send a STOP UDR, and periodically during the session, the gateway may send other UDRs. Each UDR may be compliant with the RADIUS (Remote Authentication Dial In User Service) protocol and may provide information such as a session ID, a subscriber ID, the subscriber's assigned IP address, and the number of bytes of data communicated so far during the session. Like CDRs, each UDR is typically formatted as a database record with predefined fields.

Periodically, or in response to a triggering event (such as receipt of each UDR, or receipt of a request from the billing system 50), AAA server 42 may programmatically send to the billing system 50 the UDRs that it has received. Based on the UDRs, subscriber service plans, and perhaps other data, the billing system 50 will then compute and apply charges to subscriber accounts, incrementing the subscriber's usage so far in the current billing period. For instance, if device 12 engages in a 600 kilobyte data communication session, billing controller 52 may receive one or more UDRs indicative of the session, and billing controller 52 may update the subscriber account record for device 12 to increment a running usage total by 600 kilobytes.

Note that the extent of data communication service could be tracked in other increments as well, such as in megabytes for instance. Further, other factors can be considered in establishing an extent of a subscriber's usage. Still further, PDSN 26, billing system 50, or another entity could be arranged to discount certain data communication activity by subscribers, such as sessions of particular types or sessions with particular entities for instance.

In addition to engaging in telecommunication service such as calling service and data communication service, user 10 may incur other charges during a given billing period (such as purchasing ringtones, games, or other services or applications from the service provider), and billing system 50 will preferably track those other charges as well to facilitate billing for the charges and store the charges in the account records database 54.

By way of example, user 10 may operate device 12 or another terminal 55 (e.g., a desktop computer) to browse and make purchases (such as to acquire media, hardware, or service enhancements) at an online store 56 on packet-switched network 28, and the user may charge those purchases to the account of device 12. As shown, the online store 56 is preferably coupled with billing system 50, so that billing system 50 can receive charge reports from the online store 56. (For simplicity, FIG. 1 shows a direct link between online store 56 and billing system 50. In typical practice, however, the online store and billing system may communicate with each other through packet-switched network 28.)

For instance, when user 10 makes a $45.00 online purchase under the account of device 10 (e.g., having logged in with the username and password for device 10), online store 56 would send a signaling message to billing system 50 indicating the purchase amount. Upon receipt of the message, billing controller 52 may then update the subscriber account record for device 12 to increment a running charge total by $45.00.

Similarly, user 10 may make purchases at retail outlets (e.g., carrier-operated brick-and-mortar stores). As shown, such a retail outlet 58 is preferably coupled with the billing system 50, so that billing system 50 can receive charge reports from the retail outlet 58. (For simplicity, FIG. 1 shows a direct link between retail outlet 58 and billing system 50. In typical practice, however, the retail outlet and billing system may communicate with each other through packet-switched network 28.)

For instance, when user 10 visits retail outlet 58 and makes a $65.00 purchase under the account of device 10, retail outlet 58 may send a signaling message to billing system 50 indicating the purchase amount. Upon receipt of the message, billing controller 52 may then update the subscriber account record for device 12 to increment a running charge total by $65.00. Further details on the system of FIG. 1 and how it can be used to manage spending activity are described in the co-pending U.S. patent application of Balaji S. Thenthiruperai et al. which is assigned to the assignee of this invention, Ser. No. 11/188,305 filed Jul. 25, 2005, the content of which is incorporated by reference herein.

The above detailed description is offered by way of example and not limitation of how charges for a telephone account may be recorded in a billing system. The specifics of the above description can vary without departure from the scope of the invention, the salient feature being that the service provider includes a mechanism, such as described above, to log and store account activity.

As explained in the following section, account activity is forwarded on demand or periodically to the device 12 in a manner which allows the user of the device 12 to more effectively manage their account and avoid exceeding a spending limit.

II. Account Management and Spending Limit Gauge

In one possible embodiment, the accounting system 50 is further equipped with software instructions executing in the billing controller 52 to periodically (or on demand) send account information to the telephone device 12. As another possibility, the telephone device includes a software application which logs charges that are incurred during use of the phone and stores such charge information locally. The following description will be made in the context of the phone obtaining charge information from the billing system 50 of FIG. 1.

In one typical example of how the invention can be implemented, the telephone device 12 includes a display which includes an icon such as a "my account" icon. When the user selects the "my account" icon, the telephone device 12 establishes a connection to the radio access network of FIG. 1 and pulls down account information from the billing system 50. For example the device 12 sends a request message which includes the mobile device number (MDN) of the telephone device to the billing system 50 requesting the current charges for the device. The request message is received at the billing controller 52. The controller 52 accesses the account records 54 for the device 12 and sends a reply message which includes all the current charges incurred for the device, sorted by category, such as past due charges, currently monthly charge, charges associated with ringers, applications (e.g., games), roaming charges, purchases from on-line stores 56 that are applied to the account, hardware purchases, etc. The reply message can also include the spending limit, e.g., the limit to the amount of indebtedness to the carrier the subscriber can incur without cut-off of services.

Figure 2:
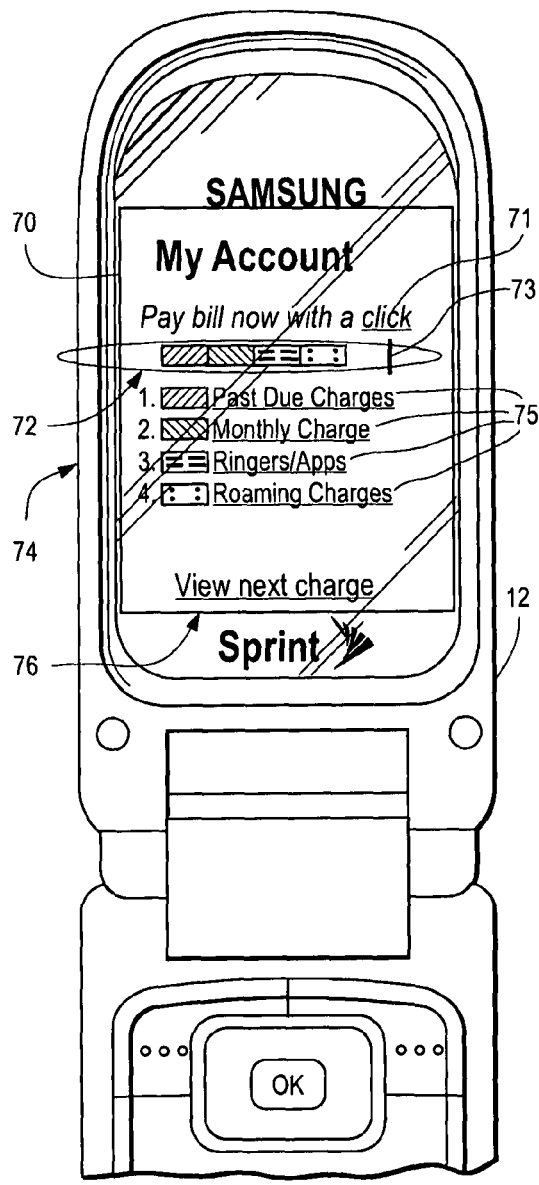
FIG. 2 is an illustration of the display of the telephone device 12 of FIG. 1, showing a graphical spending limit gauge in the form of a bar which is presented on the display. The spending limit gauge shows their current charges and their spending limit. The display helps the customer manage their account and help then avoid exceeding a spending limit.
Figure 4:
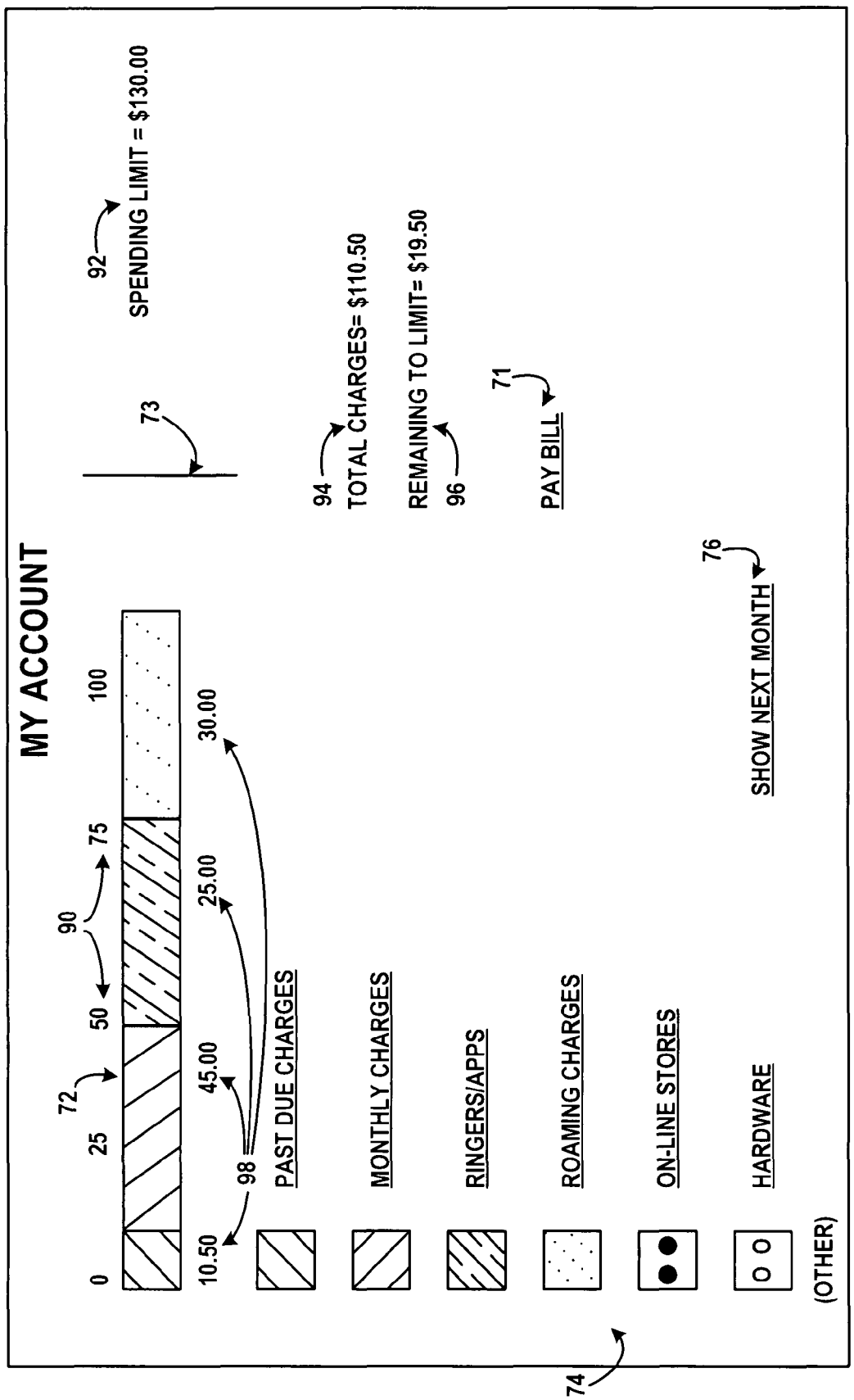
FIG. 4 is another illustration of a spending limit gauge, with the gauge calibrated, and the display indicating the totals in each spending category.

The spending information is presented on the display of the device 12 as indicated in FIG. 2. The display of FIG. 2 includes a number of unique features. First, the current charges are displayed in a graphical form, for example in the form of a bar, broken out by type of charge, as indicated at 72. The different segments in the bar are color coded to represent different types of charges, with the key shown below in the area 74. The length of the bar 72 indicates, at least on relative terms, how much has been spent. (The bar could be calibrated as shown in FIG. 4 if space on the display permits). The graphical form 72 also includes the spending limit indicated as a vertical line 73. The distance from the end of the bar 72 to the vertical line 73 indicates how close the user is to exceeding the spending limit.

In this example, the segments making up the bar 72 include past due charges, monthly charges, charges for ringers and other applications, and roaming charges. Since there are no charges in any other spending category (such as hardware or purchases from on-line stores), there are no legends for such categories in the region 74. If the user wants to see additional information about each of the categories in the region 74, the user clicks on or activates one of the links 75. When the link is activated, the display 70 displays details as to the particular charges associated with the link. The information is obtained from the billing system 50 of FIG. 1, either as part of the original response message or in response to a message sent to the billing system when the link was activated.

The display of FIG. 2 also includes a feature by which the user can make a payment to the service provider. This feature is indicated at 71. In the illustrated embodiment, feature 71 is an icon or link which is displayed and indicates they can pay a bill by clicking on the link or icon. When the link 71 is activated, the user is linked to a bill payment page served by the payment platform 60 of FIG. 1. The user makes arrangements on the page to pay their current bill. The details are not particularly important and can vary widely, such as charge the bill to their credit card, pay the bill from their checking account using an automated payment feature, or other. If the right hand end of the spending bar 72 is close to the spending limit line 73, then the user knows that they are getting close to exceeding their spending limit and therefore should make a payment. On the other hand, if they have recently paid their bill and the spending bar 72 only goes over to the right a little ways, say less than ½ the distance to the spending limit line 73, then presumably the user can wait to pay their bill.

The screen display also includes a display of a "view next charge" icon 76, which when activated shows the status of their spending when charges not yet accrued are posted, such as the next monthly service charge added to their current spending total. This feature allows the user to see, in graphical form, whether the addition of the next monthly charge will take them close to or over their spending limit.

Figure 3:
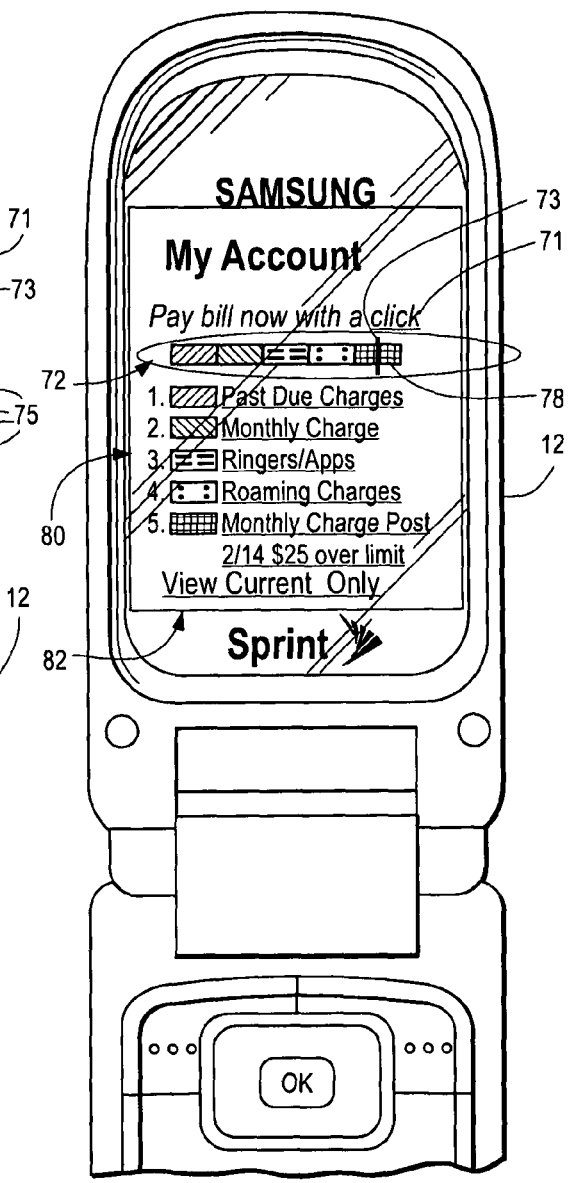
FIG. 3 is an illustration of a display similar to FIG. 2, but in FIG. 3 the next installment of the monthly charges are also included in the spending limit gauge. Note that the total charges (including the next monthly charges) exceed the spending limit, which indicates to the user that they need to pay their bill before the next monthly charges are posted in order avoid possible loss of phone service.

When the user clicks on the icon 76, the display changes to that shown in FIG. 3. Note that the spending bar 72 includes an area indicated at 78 which represents the next monthly charge. The area indicated at 78 extends the length of the bar past the spending limit line 73, indicating to the user in graphical form that unless they make a bill payment, the next monthly charge will put them over the spending limit. The display includes a field 80 which acts a legend for the color segments in the spending bar 72, including a legend for the next monthly charges (item 5 in region 80). Note that the display of the monthly charges in item 5 of region 80 includes not only the date of the next monthly charge (February 14), but also the amount the account will be over the limit ($25). In this situation, the user is advised that unless they make a payment of $25 (and do not incur any additional charges such as roaming charges) by February 14 they will be over the limit. Accordingly, in this situation the user should click on the "pay bill" icon 71 and proceed to make payment of their bill, either all of it or at least $25 of it.

The display also includes a display of an icon 82 which allows the user to choose to have current charges only displayed and thus toggle back to the display of FIG. 2.

FIG. 4 shows another example of a display of spending relative to a spending limit. The display of FIG. 4 shows more information regarding the account, and is suitable for telephone device that have larger displays than the typical cellular telephone, or for display on a computer workstation or Web-enabled television. The display of FIG. 4 includes the spending bar 72 with color coded segments showing the type and amount of spending activity, the legend field 74 showing the legend for the segments of the bar and including legends for which there is no activity in the current period (on-line stores or hardware in this example), the spending limit line 73, the pay bill link 71 and the show next month charges toggle icon 76.

The display of FIG. 4 includes display of several additional features, including a display of calibration marks (0, 25, 50, 75, 100) for the spending bar 72 which help the user understand the amount of the particular charges, a text display 92 of the spending limit ($130.00), a text display 94 of the total charges incurred in the period ($110.50), text display 96 of the amount of spending that is available until the spending limit is reached ($19.50) and display of the amount of spending in each category, indicated at 98.

Figure 5:
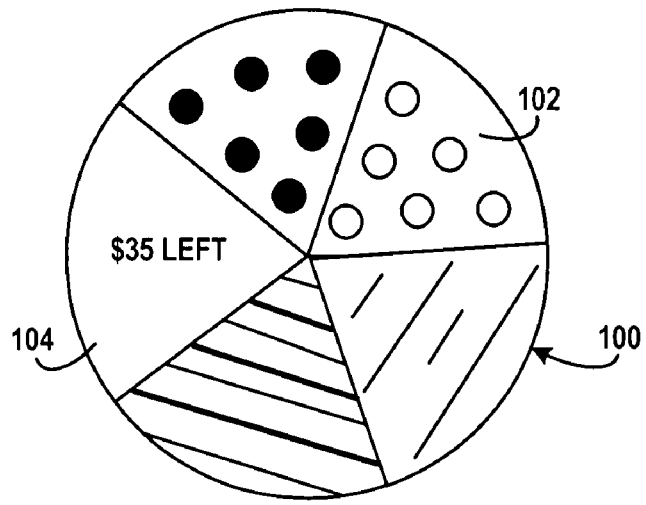
FIGS. 5 and 6 illustrate another example of a spending limit gauge in the form of a pie chart.

The graphical format in which the spending information is displayed, and the details on the spending activity that is also displayed, can of course vary from the specifics of this disclosure without departure from the scope of the invention. The format may depend on such factors as the screen size of the device on which the information is displayed, the capability of the device in rendering graphical information, and the design choices of the designer of the displays. While the form of a bar for the spending and a limit line or mark relative to the length of the bar is shown in FIGS. 2-4, persons skilled in the art can use other graphical features, such as for example a pie chart as shown in FIG. 5. In the example of FIG. 5, the spending activity is shown as pieces 102 of a pie 100, one piece 104 indicating the amount of available spending remaining to reach the spending limit. The display includes the legend filed 74 with links to detailed information on each spending category, the pay bill icon 71, and show next month icon 76.

Figure 6:
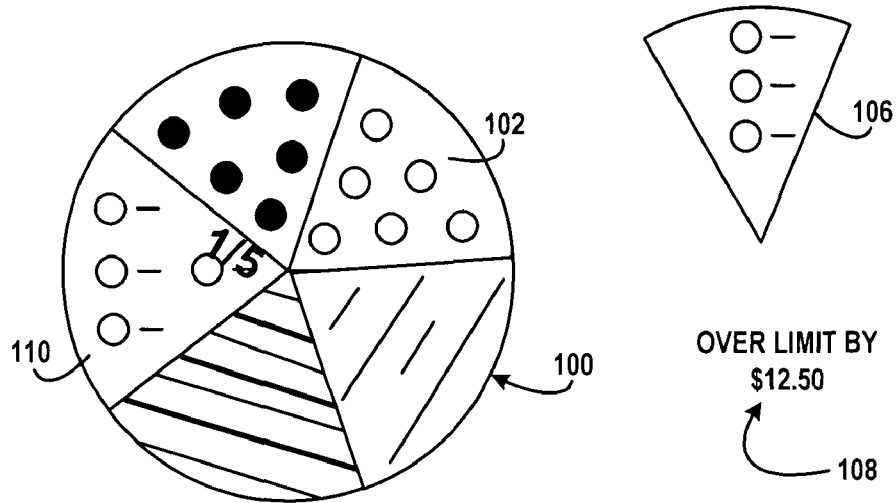

If the user clicks on the show next month 76 and the monthly charges bring the spending over the limit, then that fact could be indicated in a variety of ways, such as showing a second pie which has a piece 106 the size of which indicates how much the user is over the limit, with the first pie 100 showing the current charges and the next month charge 110 as indicated in FIG. 6. The display shows in text how much the next month charge will put the user over the limit, indicated at 108.

The method of this disclosure can be implemented by means of software instructions which are executed by a processing unit in the wireless telephone itself. Alternatively, the invention can be implemented by a general purpose computer which accesses account information and displays the information as explained herein by means of software instructions executing in the computer. For example, the subscribers' home computer can access their account information via the billing system 50 over the Internet (network 28 in FIG. 1) and then display the account information and spending limit gauge as shown in FIGS. 2-6 on the display of the computer.

In this case, the telephone service provider need not be a wireless service provider but rather could be a provider of land-line or other telephone services.

While a number of exemplary aspects and embodiments have been discussed above, those of skill in the art will recognize certain modifications, permutations, additions and sub-combinations thereof as being present in the disclosure. It is therefore intended that the following appended claims and claims hereafter introduced are interpreted to include all such modifications, permutations, additions and sub-combinations as are within their true spirit and scope.

I claim:

1. A method carried out by a wireless telephone having a display, the method comprising:
    determining a spending limit for an account associated with the wireless telephone;
    determining current charges made to the account;
    determining a first difference between the determined spending limit and the determined current charges;
    based on the first difference, determining a first distance;
    causing the display to present a graphical display, wherein causing the display to present the graphical display comprises:
        (i) causing the display to present a first graphical indication of the spending limit at a first position on the display,
        (ii) causing the display to present a second graphical indication of the current charges at a second position on the display, wherein the first position is separated from the second position by the first distance, and
        (iii) causing the display to present an icon on the display;
    receiving a selection of the icon; and
    in response to receiving the selection of the icon:
        (i) determining an additional charge that has not yet been made to the account,
        (ii) determining a sum of the current charges and the additional charge,
        (iii) determining a second difference between the spending limit and the sum,
        (iv) based on the second difference, determining a second distance, and
        (v) causing the display to present a modified graphical display, wherein causing the display to present the modified graphical display comprises:
            (a) causing the display to present the first graphical indication at the first position, and
            (b) causing the display to present a third graphical indication of the sum at a third position on the display, wherein the third position is separated from the first position by the second distance.

2. The method of claim 1, wherein:
    the second graphical indication comprises a bar having one or more segments corresponding to different types of charges; and
    the first graphical indication comprises a line that is separated from the bar by the first distance.

3. The method of claim 2, wherein causing the display to present the second graphical indication comprises:
    determining a magnitude of the current charges; and
    causing the display to present the bar in a size that is based on the magnitude.

4. The method of claim 1, wherein causing the display to present the graphical display further comprises causing the display to present a link on the display that, when activated, facilitates making a payment to a telephone service provider for the account.

5. The method of claim 1, wherein causing the display to present the graphical display further comprises causing the display to present alphanumeric text indicating the first difference.

6. The method of claim 1, wherein causing the display to present the graphical display further comprises causing the display to present a date on which the additional charge will be made to the account.

7. The method of claim 1, wherein determining the spending limit comprises downloading data representing the spending limit from a billing system over an air interface.

8. The method of claim 1, wherein determining the current charges comprises downloading data representing the current charges from a billing system over an air interface.

9. The method of claim 1, further comprising storing on the wireless telephone data representing at least one of the spending limit and the current charges.

10. A wireless telephone associated with a telephone service provider account, the wireless telephone comprising:
    a display;
    a wireless interface;
    a processor; and
    data storage containing instructions executable by the processor to:
        determine a spending limit for the account,
        determine current charges made to the account,
        determine a first difference between the determined spending limit and the determined current charges,
        based on the first difference, determining a first distance,
        cause the display to present a graphical display, wherein causing the display to present the graphical display comprises:
            (i) causing the display to present a first graphical indication of the spending limit at a first position on the display,
            (ii) causing the display to present a second graphical indication of the current charges at a second position on the display, wherein the first position is separated from the second position by the first distance, and
            (iii) causing the display to present an icon on the display;
        receive a selection of the icon, and
        in response to receiving the selection of the icon:
            (i) determine an additional charge that has not yet been made to the account,
            (ii) determine a sum of the current charges and the additional charge,
            (iii) determine a second difference between the spending limit and the sum,
            (iv) based on the second difference, determine a second distance, and
            (v) cause the display to present a modified graphical display, wherein causing the display to present the modified graphical display comprises:
                (a) causing the display to present the first graphical indication at the first position, and
                (b) causing the display to present a third graphical indication of the sum at a third position on the display, wherein the third position is separated from the first position by the second distance.

11. The wireless telephone of claim 10, wherein:
    the second graphical indication comprises a bar having one or more segments corresponding to different types of charges; and
    the first graphical indication comprises a line that is separated from the bar by the first distance.

12. The wireless telephone of claim 10, wherein the wireless interface is configured to download at least one of data representing the spending limit and data representing the current charges from a billing system over an air interface.

13. The wireless telephone of claim 10, wherein the data storage further comprises at least one of the spending limit and the current charges.

14. A non-transitory computer readable medium having stored therein instructions for execution by a computer having a central processing unit and a display, the instructions being executable to:
    determine a spending limit for an account associated with the wireless telephone;
    determine current charges made to the account;
    determine a first difference between the determined spending limit and the determined current charges;
    based on the first difference, determine a first distance;
    cause the display to present a graphical display, wherein causing the display to present the graphical display comprises:
        (i) causing the display to present a first graphical indication of the spending limit at a first position on the display,
        (ii) causing the display to present a second graphical indication of the current charges at a second position on the display, wherein the first position is separated from the second position by the first distance, and
        (iii) causing the display to present an icon on the display;
    receive a selection of the icon; and
    in response to receiving the selection of the icon:
        (i) determine an additional charge that has not yet been made to the account,
        (ii) determine a sum of the current charges and the additional charge,
        (iii) determine a second difference between the spending limit and the sum,
        (iv) based on the second difference, determine a second distance, and
        (v) cause the display to present a modified graphical display, wherein causing the display to present the modified graphical display comprises:
            (a) causing the display to present the first graphical indication at the first position, and
            (b) causing the display to present a third graphical indication of the sum at a third position on the display, wherein the third position is separated from the first position by the second distance.

15. The non-transitory computer readable medium of claim 14, wherein:
    the second graphical indication comprises a bar having one or more segments corresponding to different types of charges; and
    the first graphical indication comprises a line that is separated from the bar by the first distance.

16. The non-transitory computer readable medium of claim 14, wherein causing the display to present the second graphical indication comprises:
    determining a magnitude of the current charges; and
    causing the display to present the bar in a size that is based on the magnitude.

17. The non-transitory computer readable medium of claim 14, wherein causing the display to present the graphical display further comprises causing the display to present a link on the display that, when activated, facilitates making a payment to a telephone service provider for the account.

18. The non-transitory computer readable medium of claim 14, wherein causing the display to present the graphical display further comprises causing the display to present alphanumeric text indicating the first difference.

19. The non-transitory computer readable medium of claim 14, wherein the instructions are further executable to store on the wireless telephone data representing at least one of the spending limit and the current charges.

20. The non-transitory computer readable medium of claim 14, wherein the computer comprises the wireless telephone.

21. The non-transitory computer readable medium of claim 14, wherein the computer is separate from the wireless telephone.

* * * * *